(12) United States Patent
Nakayama et al.

(10) Patent No.: US 10,401,624 B2
(45) Date of Patent: Sep. 3, 2019

(54) HEADUP DISPLAY DEVICE

(71) Applicant: Panasonic Intellectual Property Management Co., Ltd., Osaka (JP)

(72) Inventors: Kenji Nakayama, Osaka (JP); Yutaka Masui, Kanagawa (JP); Kousuke Sasaki, Kanagawa (JP)

(73) Assignee: PANASONIC INTELLECTUAL PROPERTY CO., LTD., Osaka (JP)

( * ) Notice: Subject to any disclaimer, the term of this patent is extended or adjusted under 35 U.S.C. 154(b) by 0 days.

(21) Appl. No.: 15/736,856

(22) PCT Filed: Apr. 21, 2016

(86) PCT No.: PCT/JP2016/002141
§ 371 (c)(1),
(2) Date: Dec. 15, 2017

(87) PCT Pub. No.: WO2017/013819
PCT Pub. Date: Jan. 26, 2017

(65) Prior Publication Data
US 2018/0172989 A1 Jun. 21, 2018

(30) Foreign Application Priority Data
Jul. 23, 2015 (JP) ................................. 2015-145896

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/01* (2013.01);
(Continued)

(58) Field of Classification Search
CPC ........ G02B 27/0149; G02B 2027/0154; G02B 2027/0161; G02B 27/0101; G02B 27/01;
(Continued)

(56) References Cited

U.S. PATENT DOCUMENTS

| 1,871,877 A | * | 8/1932 | Buckman | ........... G02B 27/0101 116/246 |
| 6,504,518 B1 | | 1/2003 | Kuwayama et al. | |

(Continued)

FOREIGN PATENT DOCUMENTS

| JP | 10-115797 | 5/1998 |
| JP | 2006-069473 | 3/2006 |
| JP | 2014-115408 | 6/2014 |

OTHER PUBLICATIONS

International Search Report of PCT application No. PCT/JP2016/002141 dated Jun. 21, 2016.

*Primary Examiner* — George G King
(74) *Attorney, Agent, or Firm* — Greenblum & Bernstein, P.L.C.

(57) ABSTRACT

A headup display device includes: a display having an emission surface that emits display light relating to predetermined information; a reflecting member that is disposed above the display and reflects the display light emitted from the display; a combiner part on which the display light reflected off the reflecting member is incident; a transmissive member that is disposed between the display and the reflecting member to cover the emission surface and transmits the display light emitted from the display toward the reflecting member; and a blocking member that is disposed above the transmissive member and blocks out light that is reflected off the transmissive member to be incident on the combiner part. A transmissive-member-side end of the blocking member is disposed to be movable from a first (Continued)

position where the light is blocked out to a second position closer to the transmissive member than the first position is.

5 Claims, 9 Drawing Sheets

(52) U.S. Cl.
CPC .. *G02B 27/0101* (2013.01); *B60K 2350/2052* (2013.01); *B60K 2350/2082* (2013.01); *B60K 2350/2086* (2013.01); *B60K 2350/405* (2013.01); *G02B 2027/013* (2013.01); *G02B 2027/0154* (2013.01); *G02B 2027/0161* (2013.01)

(58) Field of Classification Search
CPC .............. G02B 2027/013; B60K 35/00; B60K 2350/2052; B60K 2350/2082; B60K 2350/2086; B60K 2350/405
USPC .................................................. 359/601, 630
See application file for complete search history.

(56) References Cited

U.S. PATENT DOCUMENTS

2008/0285138 A1* 11/2008 Lebreton ................ B60K 35/00
　　　　　　　　　　　　　　　　　　　　　　　　　359/630
2019/0025579 A1* 1/2019 Furusawa .............. B60K 35/00

* cited by examiner

FIG. 6B

HEADUP DISPLAY DEVICE

This application is a U.S. national stage application of the PCT International Application No. PCT/JP2016/002141 filed on Apr. 21, 2016, which claims the benefit of foreign priority of Japanese patent application No. 2015-145896 filed on Jul. 23, 2015, the contents all of which are incorporated herein by reference.

TECHNICAL FIELD

The present disclosure relates to a headup display device to be mounted to a vehicle.

BACKGROUND ART

A conventionally known headup display device is mounted to a vehicle such as an automobile and displays information on a combiner to assist a driver.

One known example of such a headup display device includes, in addition to a display that emits display light relating to predetermined information and a mirror that reflects the display light emitted from the display toward a combiner, a transparent cover that prevents an object (such as trash or a coin) from entering the device (refer to, for example, PTL 1 or 2).

CITATION LIST

Patent Literatures

PTL 1: Unexamined Japanese Patent Publication No. H10-115797
PTL 2: Unexamined Japanese Patent Publication No. 2006-069473

SUMMARY OF THE INVENTION

With a headup display device of PTL 1 or 2, however, external light (such as sunlight) is reflected off a transparent cover, thus resulting in stray light, and this stray light causes impaired visibility to a user when incident on a combiner.

Accordingly, a blocking member may conceivably be disposed above the transparent cover to block out the external light that heads toward the transparent cover, for prevention of generation of stray light. However, in cases where the object enters between the transparent cover and the blocking member, the blocking member becomes an obstruction, so that it is problematically difficult for the user to take out the object.

An object of the present disclosure is to provide a headup display device that is capable of preventing generation of stray light and facilitating removal of an object that enters the device.

A headup display device according to the present disclosure includes a display having an emission surface that emits display light relating to predetermined information, a reflecting member that is disposed above the display and reflects the display light emitted from the display, and a combiner part on which the display light reflected off the reflecting member is incident. The headup display device also includes a transmissive member that is disposed between the display and the reflecting member to cover the emission surface of the display and transmits the display light emitted from the display toward the reflecting member, and a blocking member that is disposed above the transmissive member and blocks out light that is otherwise reflected off the transmissive member to be incident on the combiner part. Structurally, a transmissive-member-side end of the blocking member is disposed to be movable from a first position where the light is blocked out to a second position that is closer to the transmissive member than the first position is.

According to the present disclosure, the headup display device provided is capable of preventing generation of stray light and facilitating removal of an object that enters the device.

DESCRIPTION OF EMBODIMENT (Background Leading up to an Exemplary Embodiment of the Present Disclosure)

Some headup display devices to be mounted to a vehicle are designed to be compact longitudinally of a vehicle (in a direction from front to rear of the vehicle) in consideration of their placement on an instrument panel. As such, a display is disposed below a mirror in each of such headup display devices to ensure an optical path of display light. Moreover, a transparent cover is disposed between the display and the mirror to protect the surface of the display from which the display light is emitted. However, external light (such as sunlight) is reflected off the transparent cover, thus resulting in stray light, and this stray light causes impaired visibility to a user when incident on a combiner. Accordingly, a blocking member may conceivably be disposed above the transparent cover to block out the external light that heads toward the transparent cover, for prevention of generation of stray light. However, in cases where an object enters between the transparent cover and the blocking member, the blocking member becomes an obstruction, so that it is problematically difficult for the user to take out the object. In the present disclosure, a description is provided of a headup display device that is capable of preventing generation of stray light and facilitating removal of an object that enters the device.

The exemplary embodiment of the present disclosure is hereinafter described with reference to the accompanying drawings.

Figure 1:
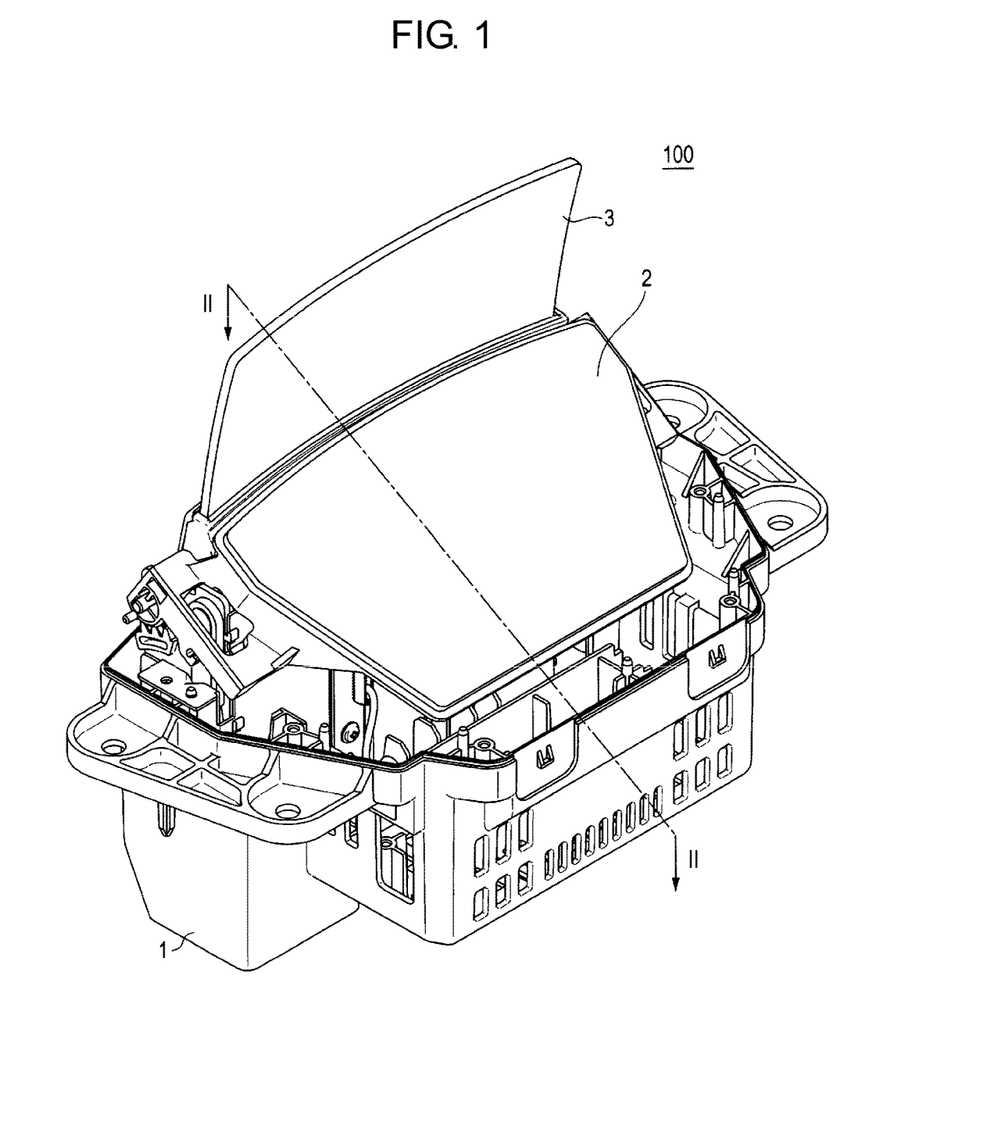
FIG. 1 is an external perspective view of a headup display device according to an exemplary embodiment of the present disclosure.
Figure 2:
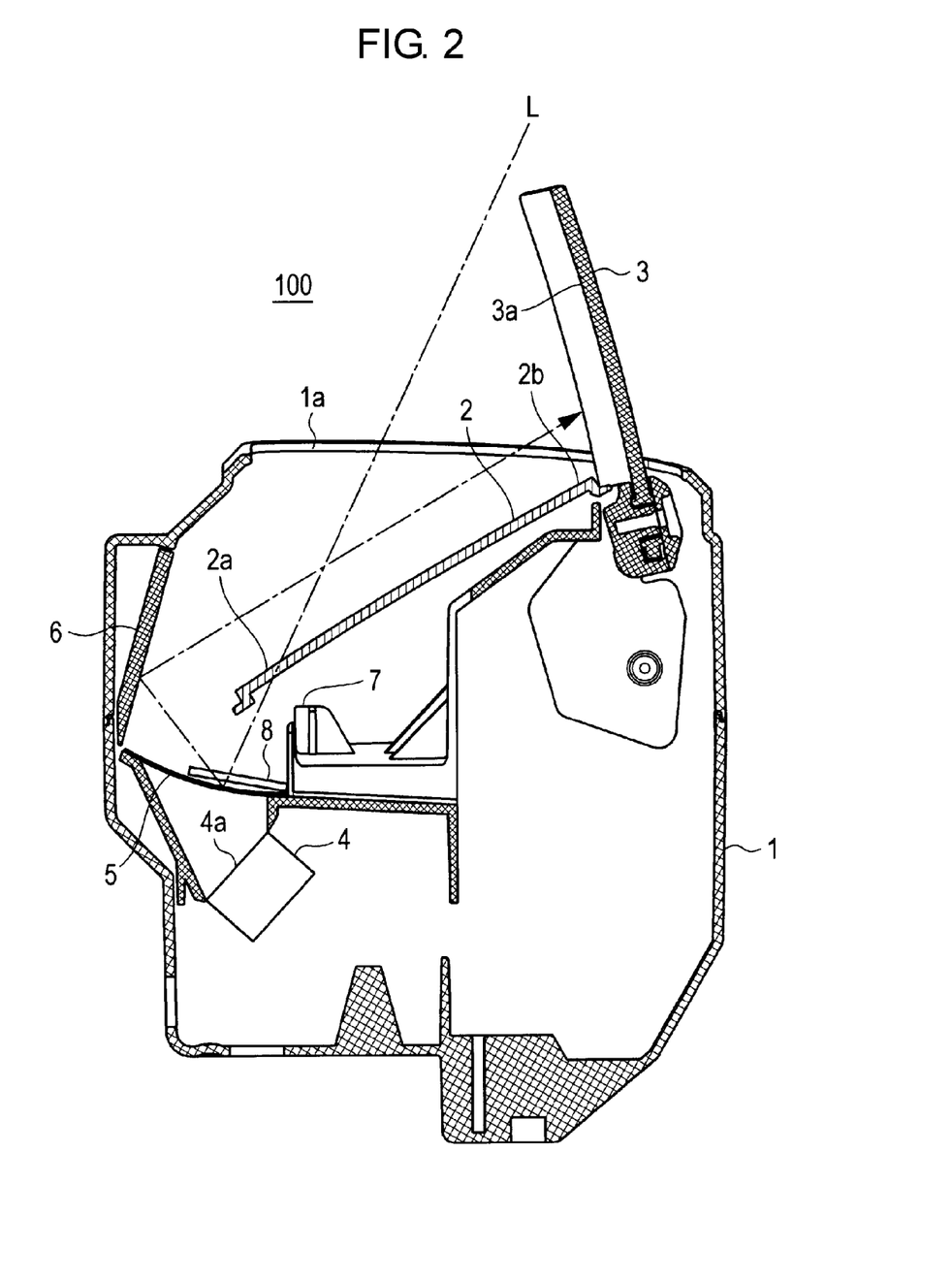
FIG. 2 is a sectional side elevation illustrating an interior of the headup display device according to the exemplary embodiment of the present disclosure when an end of a blocking cover is located at a first position.
Figure 3:
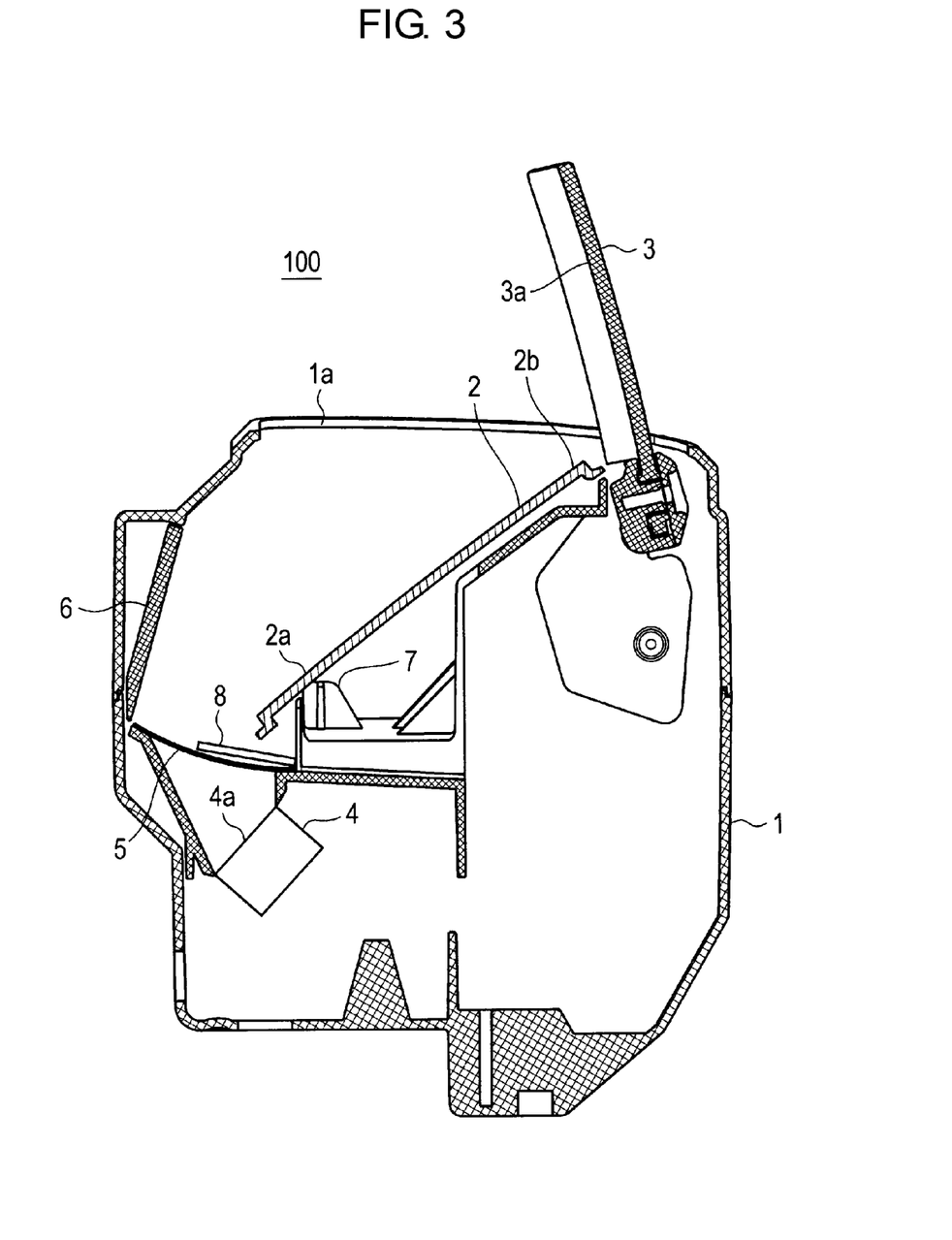
FIG. 3 is a sectional side elevation illustrating an interior of the headup display device according to the exemplary embodiment of the present disclosure when the end of the blocking cover is located at a second position.

A structural example of headup display device 100 according to the present exemplary embodiment is described first with reference to FIGS. 1 to 3. FIG. 1 is an external perspective view of headup display device 100. FIG. 2 is a sectional view taken along line II-II in FIG. 1. FIG. 3 is a sectional view as same as FIG. 2 in a state where end 2a of blocking cover 2 is located at a second position to be described below.

Headup display device 100 is disposed, for example, on an instrument panel (also referred to as a dashboard) of a vehicle and projects a predetermined image on combiner 3 according to operation by a user (i.e. a driver or a passenger). FIGS. 1 to 3 show combiner 3 in a raised position.

Headup display device 100 includes housing 1, blocking cover 2, combiner 3, display 4, transparent cover 5, mirror 6, and stopper (support) 7.

Housing 1 accommodates blocking cover 2, combiner 3, display 4, transparent cover 5, mirror 6, and stopper 7. Housing 1 is provided with opening 1a in the center of its upper part.

Blocking cover 2 (an example of a blocking member) is a plate-shaped member that is at least partly formed of, for example, flexible material such as synthetic resin and is disposed above transparent cover 5.

Blocking cover 2 has ends 2a and 2b. End 2b is fixed to housing 1.

In FIG. 2, end 2a of blocking cover 2 is in a first position where external light L that heads toward transparent cover 5 is blocked out. When end 2a thus is located at the first position, external light L can be prevented from being reflected off transparent cover 5 and being incident (as stray light) on combiner 3.

When end 2a is located at the first position and is urged downward from above, blocking cover 2 is deformed because blocking cover 2 is formed of the flexible material. Thus, end 2a can move from the first position to a second position shown in FIG. 3. The second position is closer to transparent cover 5 than the first position is.

Combiner 3 is, for example, a half mirror and is formed of plate glass and an optically semi-transmissive film of, for example, tin or silver that is vapor-deposited on one surface of the plate glass. Combiner 3 is semi-transmissive, thus allowing the user to see a front of the vehicle through combiner 3.

When combiner 3 is in a raised position (illustrated by FIGS. 1 to 3), display light relating to predetermined information is emitted from display 4, is reflected off mirror 6 and is incident on projection surface 3a of combiner 3.

Thus, the user can see the predetermined information projected on the combiner 3, superimposed on a forward view of the vehicle. The information is, for example, an image that includes a vehicle speed and a remaining amount of fuel or an image that includes a distance to a destination, a traveling direction, a name of a current location, and names of institutions and shops that are near the current location.

Display 4 is, for example, a liquid crystal display and emits display light relating to predetermined information from emission surface 4a. Emission surface 4a is slantingly disposed to allow the display light emitted to be incident on mirror 6.

Transparent cover 5 (an example of a transmissive member) is formed of, for example, transparent resin and is disposed above display 4 and below mirror 6 to cover emission surface 4a of display 4. Transparent cover 5 transmits the display light emitted from display 4 toward mirror 6. Transparent cover 5 also protects display 4 from, for example, an object that enters (falls into) housing 1 through opening 1a. The object is, for example, trash or a coin. In the present exemplary embodiment, coin 8 is cited in the description as an example of the object as shown in FIGS. 2 and 3.

Mirror 6 (an example of a reflecting member) is disposed above display 4 and reflects toward projection surface 3a of combiner 3 the display light emitted from display 4 through transparent cover 5.

Stopper 7 is disposed below blocking cover 2. As shown in FIG. 2, a space is provided between end 2a and stopper 7 when end 2a is located at the first position. When end 2a is moved to the second position, stopper 7 supports end 2a as shown in FIG. 3. Accordingly, downward movement of end 2a beyond the second position can be prevented from causing damage to, for example, a fixed part of end 2b that might otherwise be under great force. The downward movement of end 2a beyond the second position can also be prevented from causing damage to, for example, transparent cover 5 that might otherwise come in contact with end 2a.

The structural example of headup display device 100 has been described above.

With reference to FIGS. 2 and 3, a description is provided next of movement of blocking cover 2 in headup display device 100 when the user takes out the object that has fallen into housing 1.

Suppose that, for example, coin 8 that has fallen into housing 1 through opening 1a is on transparent cover 5 as shown in FIG. 2. In this case, the user puts his/her hand into opening 1a and pushes down end 2a that is at the first position. End 2a is thus moved downward to the second position shown in FIG. 3. End 2a that has moved to the second position abuts on stopper 7 to be supported, thus is restricted so as not to move downward beyond the second position.

As a result of the movement of end 2a from the first position to the second position, a larger space between opening 1a and transparent cover 5 is secured. Accordingly, it becomes easier for the user to take out coin 8 on transparent cover 5.

After the user takes out coin 8 and takes his/her hand off blocking cover 2, end 2a is restored from the second position to the first position by return force.

As described above, headup display device 100 according to the present embodiment is capable of preventing generation of stray light when end 2a of blocking cover 2 is in the first position. Moreover, in cases where the object such as coin 8 enters between blocking cover 2 and transparent cover 5 in headup display device 100 of the present embodiment, end 2a of blocking cover 2 is moved from the first position to the second position as the user pushes down end 2a. In this way, a larger space can be secured between opening 1a and transparent cover 5, so that the user can take out the object with ease.

(Modifications of the Exemplary Embodiment)

The headup display device according to the present disclosure is not limited to the one described in the above exemplary embodiment. A description is provided hereinafter of modifications made in the above exemplary embodiment. It is to be noted that in the drawings that are used for the description of the following modifications, the same constituent elements as those in FIGS. 1 to 3 are given the same reference marks, and descriptions of those constituent elements are omitted.

First Modification

Figure 4A:
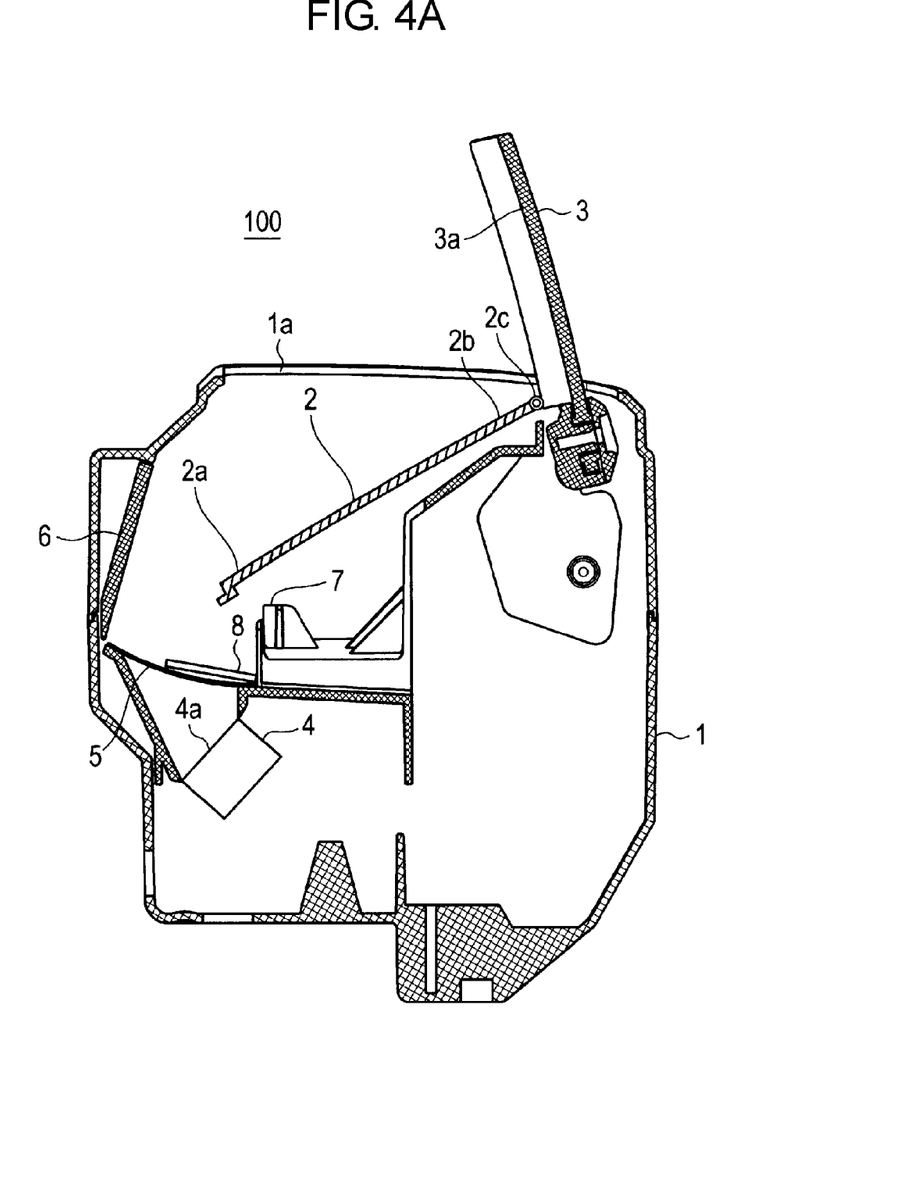
FIG. 4A is a sectional side elevation illustrating an interior of a headup display device according to a first modification of the exemplary embodiment of the present disclosure when an end of a blocking cover is located at a first position.
Figure 4B:
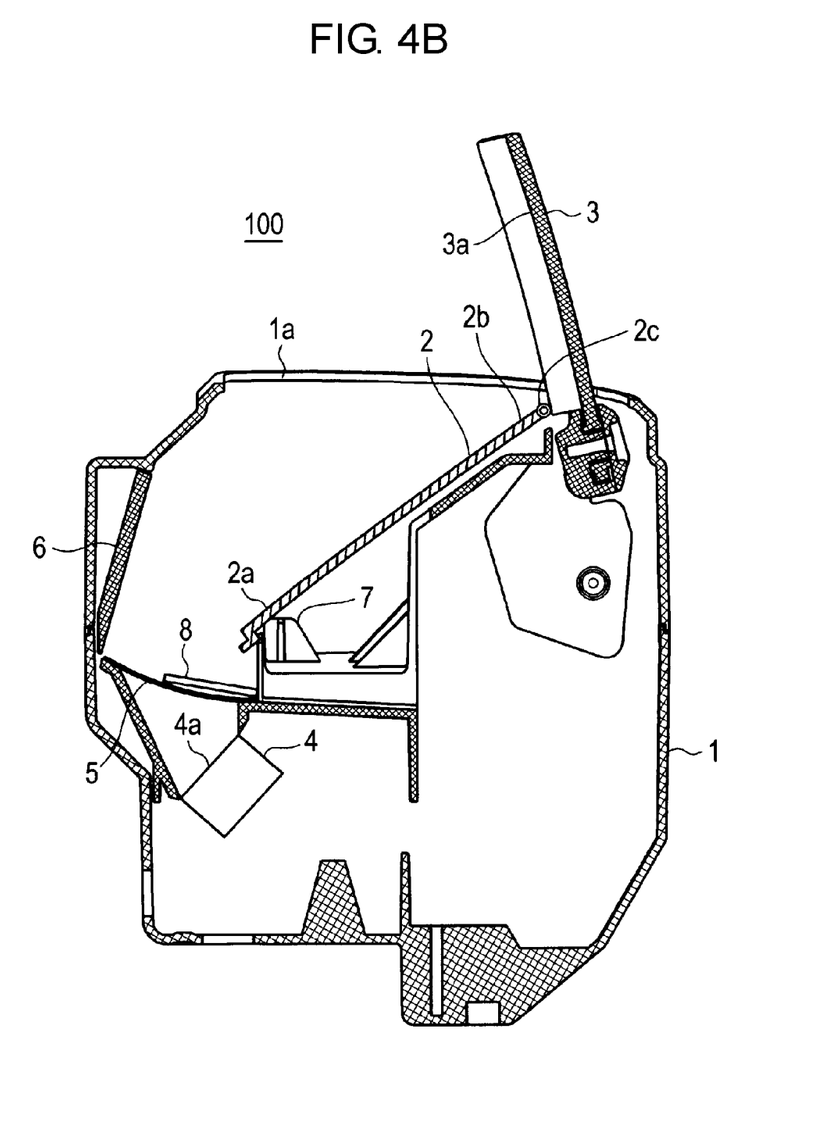
FIG. 4B is a sectional side elevation illustrating an interior of the headup display device according to the first modification of the exemplary embodiment of the present disclosure when the end of the blocking cover is located at a second position.

As shown in FIGS. 4A and 4B, end 2b of blocking cover 2 may be provided with rotation axis 2c. When pushed down while being in the first position (see FIG. 4A), end 2a turns counterclockwise around rotation axis 2c, thus moves to the second position (see FIG. 4B). In this case, even when blocking cover 2 is not flexible, end 2a can be moved from the first position to the second position, so that blocking cover 2 can be formed of inflexible material (such as metal).

It is to be noted that an elastic body (such as a spring) may be provided on stopper 7 so that end 2a of blocking cover 2 is moved from the second position to the first position by return force of the elastic body when a user takes his/her hand off blocking cover 2.

Second Modification

Figure 5A:
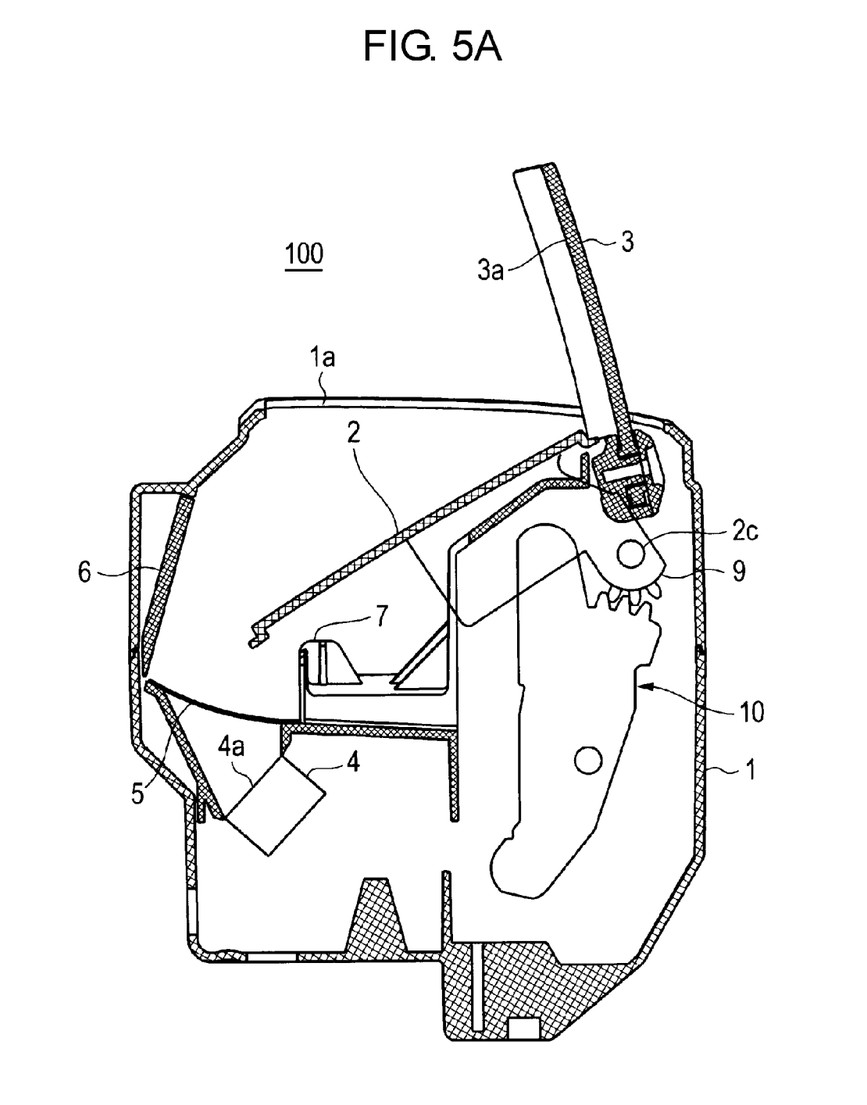
FIG. 5A is a sectional side elevation illustrating an interior of a headup display device according to a second modification of the exemplary embodiment of the present disclosure when a blocking cover is located at a first position.
Figure 5B:
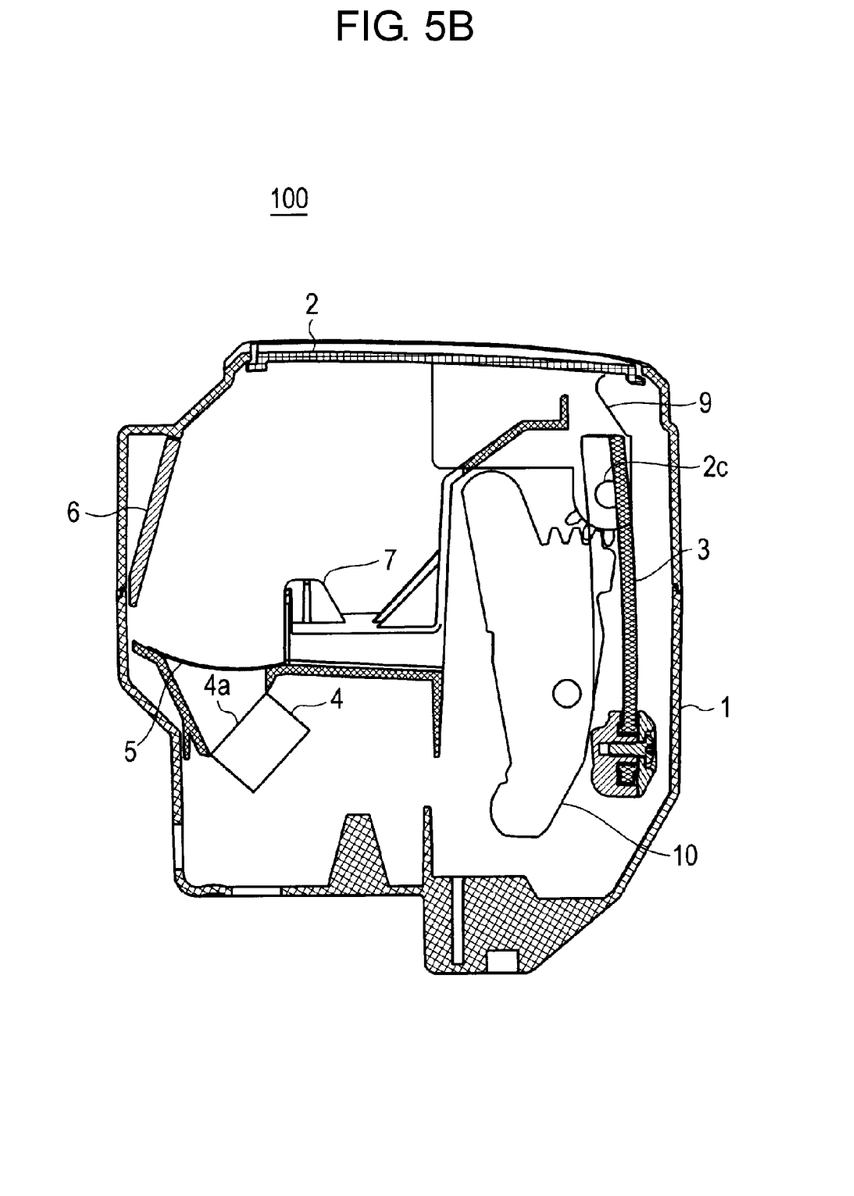
FIG. 5B is a sectional side elevation illustrating an interior of the headup display device according to the second modification of the exemplary embodiment of the present disclosure when the blocking cover is located at a third position.

As shown in FIGS. 5A and 5B, gear part 9 may be included to be fixed to blocking cover 2, and gear part 10 may be included to mesh with gear part 9. Gear parts 9, 10 form a mechanism that transforms downward movement of combiner 3 into rotational motion of gear part 9 around rotation axis 2c. When combiner 3 moves downward from its raised position shown in FIG. 5A to be accommodated into housing 1, blocking cover 2 turns clockwise around rotation axis 2c of gear part 9. When combiner 3 is accommodated within housing 1, blocking cover 2 is moved to a third position to cover opening 1a of housing 1 as shown in FIG. 5B. When combiner 3 is not in use, blocking cover 2 covers opening 1a, so that an object can be prevented from entering housing 1 through opening 1a.

In the example illustrated by FIGS. 5A and 5B, combiner 3 is accommodated in the housing 1 in a vertical direction of housing 1. However, combiner 3 may turn counterclockwise around a predetermined rotation axis to assume a prostrate state (for example, a state similar to the state of blocking cover 2 in FIG. 5B) when accommodated in housing 1.

Third Modification

Figure 6A:
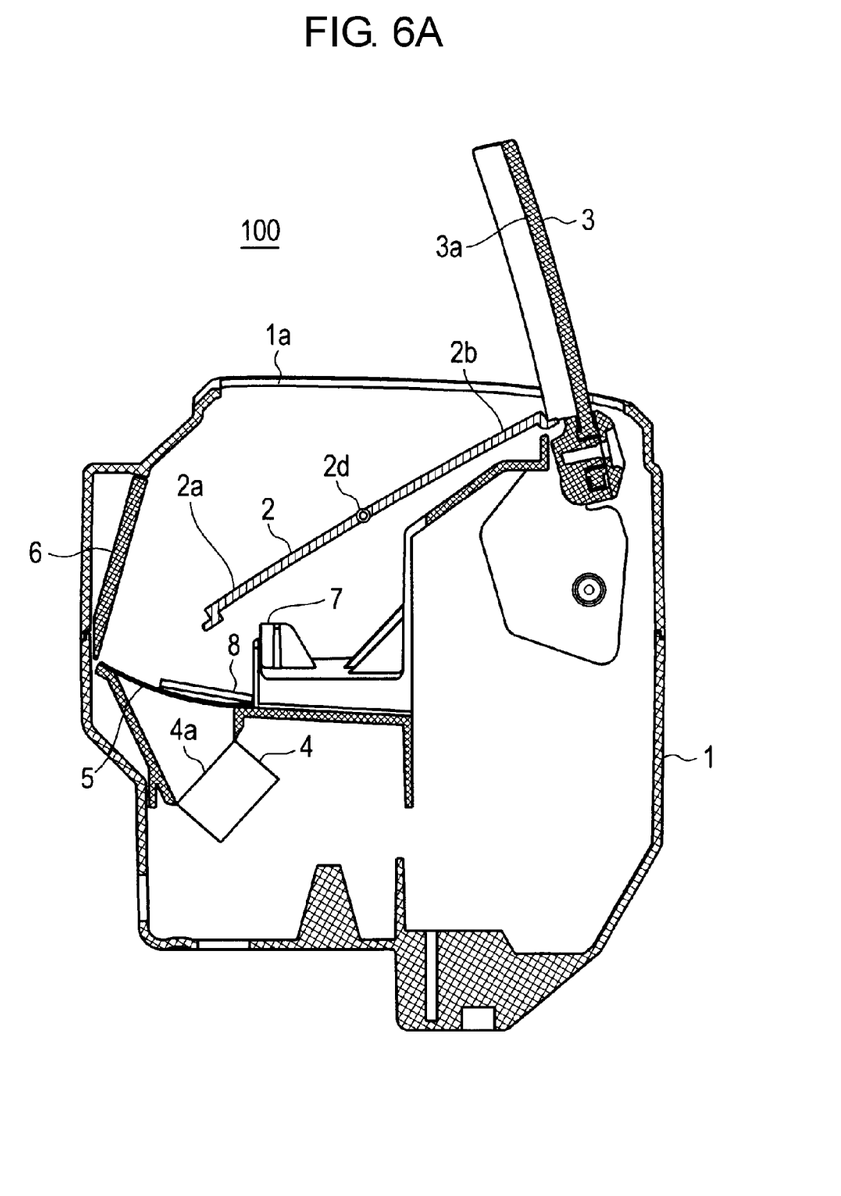
FIG. 6A is a sectional side elevation illustrating an interior of a headup display device according to a third modification of the exemplary embodiment of the present disclosure when an end of a blocking cover is located at a first position.
Figure 6B:
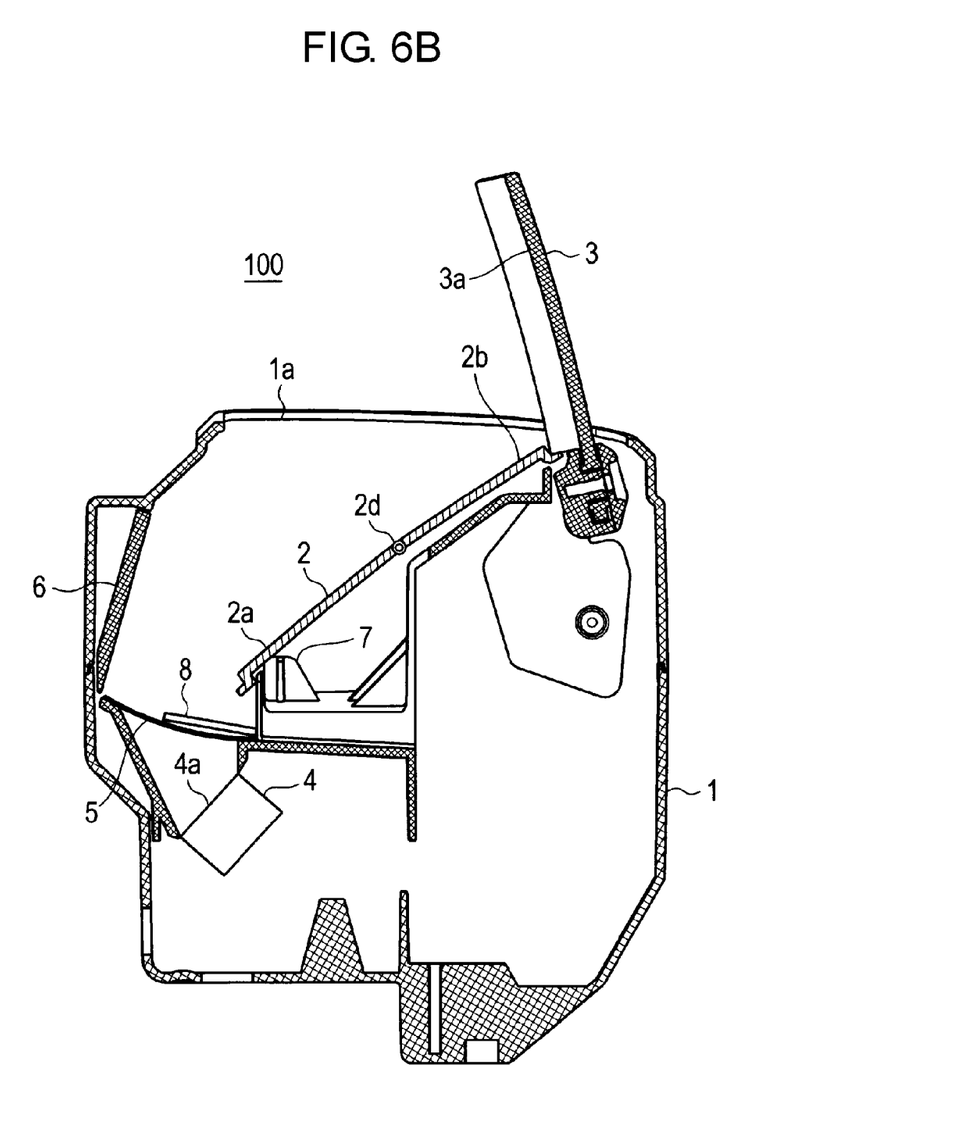
FIG. 6B is a sectional side elevation illustrating an interior of the headup display device according to the third modification of the exemplary embodiment of the present disclosure when the end of the blocking cover is located at a second position.

As shown in FIGS. 6A and 6B, rotation axis 2d (such as a rotation axis of a hinge) may be provided between end 2a and end 2b of blocking cover 2. When pushed down while being in the first position (see FIG. 6A), end 2a turns counterclockwise around rotation axis 2d, thus moves to the second position (see FIG. 6B). In this case, even when blocking cover 2 is not flexible, end 2a can be moved from the first position to the second position, so that blocking cover 2 can be formed of inflexible material (such as metal).

INDUSTRIAL APPLICABILITY

The present disclosure is utilizable in a headup display device to be mounted to a vehicle.

REFERENCE MARKS IN THE DRAWINGS 1 housing
1a opening
2 blocking cover
2a, 2b end
2c, 2d rotation axis
3 combiner
3a projection surface
4 display
4a emission surface
5 transparent cover
6 mirror
7 stopper (support)
8 coin
9, 10 gear part
100 headup display device

The invention claimed is:

1. A headup display device comprising:
a display that emits display light relating to predetermined information;
a reflecting member that is disposed above the display, and reflects the display light emitted from the display;
a combiner part on which the display light reflected off the reflecting member is incident;
a transmissive member that is disposed between the display and the reflecting member to cover a surface from which the display light is emitted, and transmits the display light emitted from the display toward the reflecting member;
a blocking member that is disposed above the transmissive member, and blocks out light that is otherwise reflected off the transmissive member to be incident on the combiner part;
a support that is disposed below the blocking member; and
a housing that accommodates the display, the reflecting member, the transmissive member, and the blocking member, the housing including an opening, wherein
the blocking member is disposed to be movable from a first position where the light is blocked out to a second position that is closer to the transmissive member than the first position is,
when the blocking member is in either the first position or the second position, the opening of the housing is opened,
the blocking member is spaced from the support when the blocking member is in the first position, and
the blocking member contacts the support when the blocking member is in the second position.

2. The headup display device according to claim 1, wherein the blocking member is at least partly formed of flexible material.

3. The headup display device according to claim 1, wherein a transmissive-member-side end of the blocking member moves from the first position to the second position when the blocking member turns around a rotation axis provided to the blocking member.

4. The headup display device according to claim 1, wherein the blocking member is turnable around a predetermined rotation axis to a third position such that the blocking member covers an opening of the housing.

5. The headup display device according to claim 1, wherein the combiner part is configured to move vertically between a stored position and an extended position above the stored position such that a surface of the combiner part extends outward from the opening of the housing, the combiner part being positioned in the housing when the combiner is in the stored position, the display light reflected off the reflecting member being incident on the surface when the combiner part is in the extended position, wherein, when the combiner part is in the stored position, the opening of the housing is blocked by the blocking member, and when the combiner part is in the extended position, the blocking member is in either the first position or the second position such that the opening of the housing is opened.

* * * * *